DIVIDING CIRCUIT BASED ON AMPLITUDE TO TIME CONVERSION

Filed May 12, 1966

INVENTOR
R. L. NANCE
BY [signature]
ATTORNEY

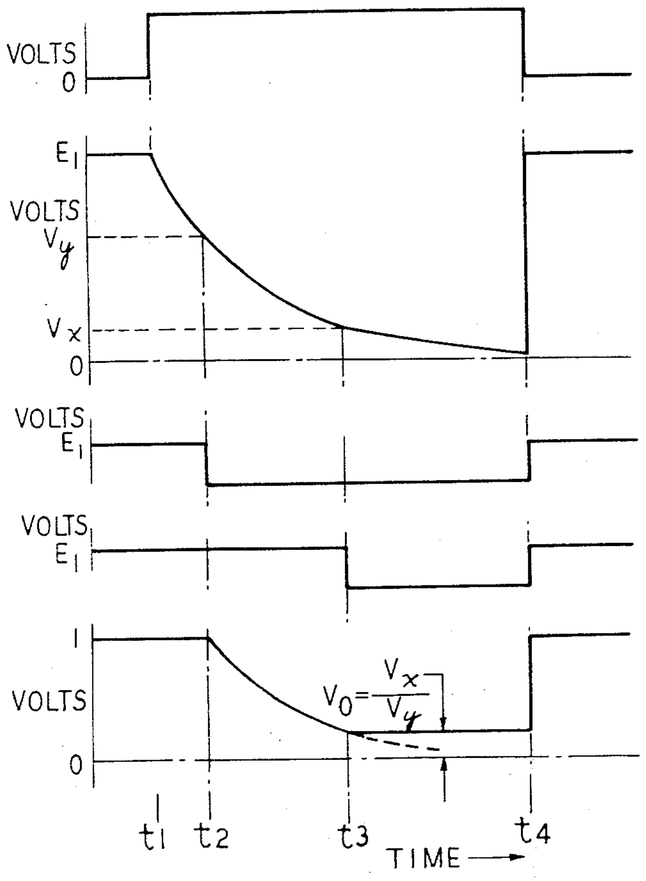
FIG. 2A INPUT TO EXPONENTIAL GENERATOR 10, FIG. 2B OUTPUT OF EXPONENTIAL GENERATOR 10, FIG. 2C OUTPUT OF AMPLITUDE DISCRIMINATOR 11, FIG. 2D OUTPUT OF AMPLITUDE DISCRIMINATOR 12, FIG. 2E OUTPUT OF EXPONENTIAL GENERATOR 13
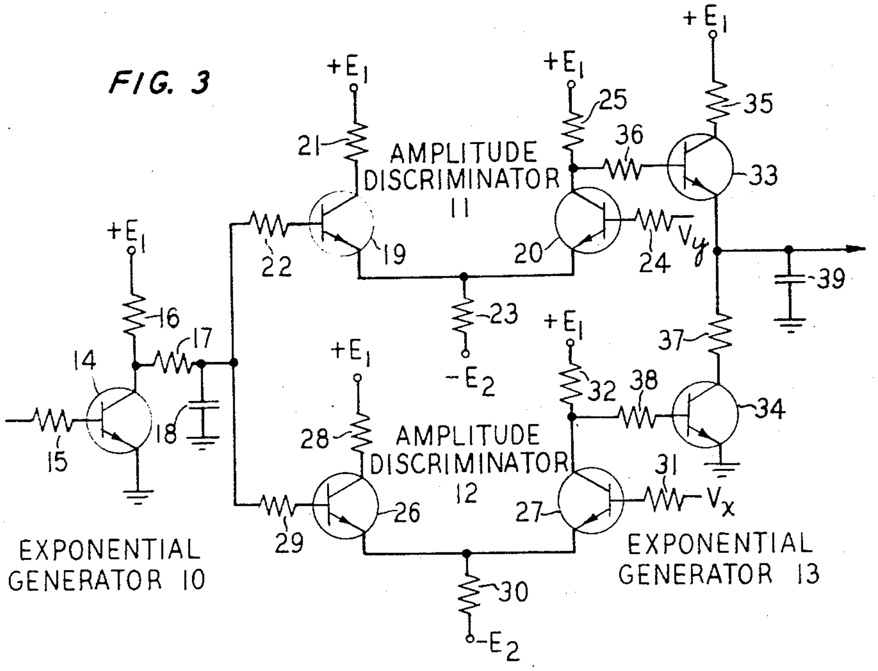
FIG. 3

United States Patent Office 3,423,580
Patented Jan. 21, 1969

3,423,580

DIVIDING CIRCUIT BASED ON AMPLITUDE TO TIME CONVERSION

Robert L. Nance, Burlington, N.C., assignor to Bell Telephone Laboratories, Incorporated, New York, N.Y., a corporation of New York Filed May 12, 1966, Ser. No. 549,561
U.S. Cl. 235—196 4 Claims
Int. Cl. G06g 7/16

ABSTRACT OF THE DISCLOSURE

A dividing circuit is disclosed in which the output of a first exponential generator is applied to first and second amplitude discriminators whose outputs in turn are applied to a second exponential generator. The second generator is enabled when the first generator output reaches a first level and clamped when the first generator output reaches a second level. The output level of the clamped second generator is linearly related to the ratio of the first and second levels.

This invention relates to analog computing circuits for determining the ratio of two voltages.

Performing division through the use of electrical circuits presents a problem when speed and accuracy are important considerations. One technique that has been devised to overcome this problem introduces, uses and then eliminates time as a dependent parameter. This technique is analogous to the mathematical one using logarithms.

One or more limitations exist in prior art circuits using the above-mentioned technique. Some of these circuits, for example, present loading problems because input signals are used to charge capacitors. Furthermore, some have relatively small dynamic operating ranges because their operations are limited to the relatively straight portions of RC charging curves. Still further, some prior art circuits produce accurate outputs only when they are operating in a regular cyclic manner; they are not useful, therefore, when the inputs are of a random sample nature. Any one or more of these limitations is frequently unacceptable.

An object of the invention is to compute the ratio of two voltages with a high degree of accuracy and within a submicrosecond time interval.

Another object of the invention is to increase the dynamic range of analog computing circuits.

These and other objects are achieved in accordance with the invention through the use of two voltages which change exponentially at substantially the same rate. A first of these voltages begins to exponentially change in response to an external signal. When this voltage passes through a first level, the second voltage begins to exponentially change. When the first voltage passes through a second level, the level of the second exponentially changing voltage is clamped. The clamped level of the second voltage is the product of a constant and the ratio of the first and second levels of the first voltage. If the second voltage exponentially decays from an initial level of one volt, this constant equals one and the clamped output level indicates the ratio of the first and second levels.

A feature of the invention is that exponential generators are charged by internal power supplies rather than by input voltages as in prior art circuits. In particular, input voltages are used only for triggering and threshold detection, thus reducing input loading, if any, to a minor level.

Another feature of the invention is that a relatively large dynamic operating range is achieved because operation is not limited to the relatively straight portions of exponential curves.

Still another feature is that the computing circuit is preconditioned in response to the termination of a previous computation. Thus, the computing circuit need not be operated in a cyclic manner in order to produce accurate outputs.

Other objects and features of the invention will become apparent from a study of the following detailed description of an illustrative embodiment.

In the drawings:

FIGS. 2A through 2E are waveforms of input and output voltages of blocks in FIG. 1;

FIG. 3 is a schematic diagram of the embodiment of FIG. 1; and

Figure 1:
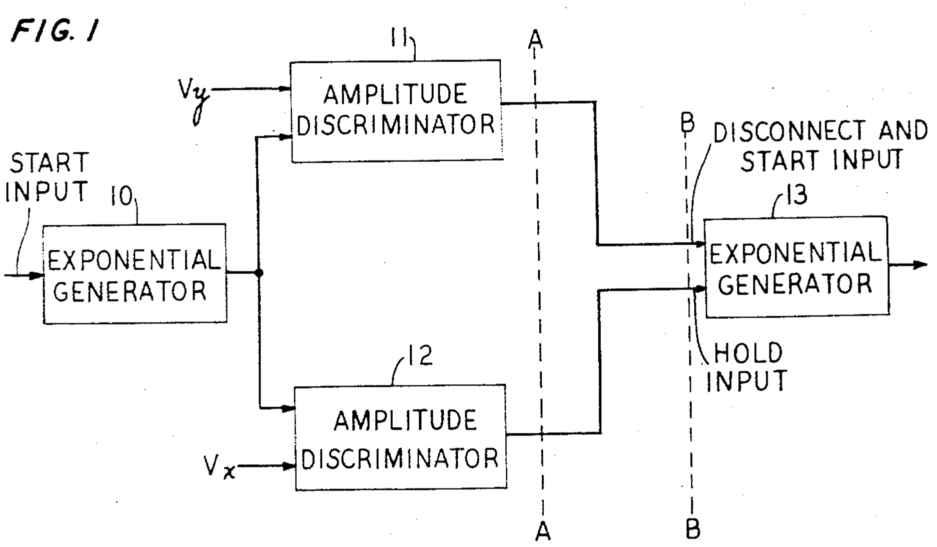
FIG. 1 is a block diagram of an embodiment of the invention.

The block diagram of FIG. 1 includes an exponential generator 10 that produces an exponentially decaying output in response to a voltage applied to a start input. The output of generator 10 is applied to each one of a pair of amplitude discriminators 11 and 12. Each of the discriminators has a second input with a voltage $Vy$ applied to the second input of discriminator 11 and a voltage $Vx$ applied to the second input of discriminator 12. Each of the discriminators produces an output when its input from generator 10 is less than its other input. The discriminator outputs are applied to an exponential generator 13 as a disconnect and start input and a hold input, respectively. In response to a voltage on its disconnect and start input, generator 13 produces a voltage that exponentially decays at the same rate as the output of generator 10. The output of generator 13 is clamped in response to a voltage on generator 13 hold input.

The operation of FIG. 1 may be better understood by referring to the waveforms of FIGS. 2A through 2E. These waveforms have been placed in time alignment so that the time scale indicated in FIG. 2E applies as well to FIGS. 2A through 2D.

Prior to time $t1$, the input to generator 10 is zero volts. During this same interval, the output of generator 10 is E1 volts while the output of generator 13 is one volt. At time $t1$, a positive voltage (FIG. 2A) is applied to the input of generator 10 and the output (FIG. 2B) of generator 10 begins to decay exponentially. At time $t2$, the output of generator 10 passes through the level of voltage $Vy$ and the output (FIG. 2C) of discriminator 11 assumes a lower potential sufficient to start exponential generator 13. When this occurs, generator 13 produces a time-delayed exponentially decaying output (FIG. 2E). At time $t3$, the output (FIG. 2B) of generator 10 passes through the level of voltage $Vx$ and the output (FIG. 2D) of discriminator 12 assumes a lower potential sufficient to clamp the output (FIG. 2E) of generator 13.

At time $t4$, the input (FIG. 2A) of generator 10 returns to zero volts and generator 10 recharges to produce an output (FIG. 2B) of E1 volts. When generator 10 recharges, the outputs (FIGS. 2C and 2D) of discriminators 11 and 12 return to voltage E1. This, in turn, permits generator 13 to recharge so that its output (FIG. 2E) returns to a one volt level. At this point in time, the circuit has completed one cycle and is ready to begin another.

The clamped output $Vo$ (FIG. 2E) of generator 13 in the interval $t3$–$t4$ represents the ratio of voltage $Vx$ to the voltage $Vy$. This is believed apparent from the following equations:

$$Vy=E1\epsilon^{-(t2-t1)/T} \quad (1)$$

where T is the time constant of generator 10; from (1), $$(t2-t1)=-T\ln(Vy/E1) \quad (2)$$

$$Vx=E1\epsilon^{-(t3-t1)/T} \quad (3)$$

where T is again the time constant of generator 10; from (3), $$(t3-t1)=-Tln(Vx/E1) \quad (4)$$

from (2) and (4), $$(t3-t2)=-Tln(Vx/Vy) \quad (5)$$

from (5), $$Vx/Vy=\epsilon^{-(t3-t2)/T} \quad (6)$$

between times $t3-t4$ of FIG. 2E, $$Vo=1\epsilon^{-(t3-t2)/T} \quad (7)$$

where T is the time constant of generator 13, which is equal to that of generator 10; and from (6) and (7), $$Vo=Vx/Vy \quad (8)$$

The circuit shown schematically in FIG. 3 includes an exponential generator 10 comprising a transistor 14, resistors 15, 16 and 17 and a capacitor 18. In the absence of a positive potential on the base of transistor 14, transistor 14 is non-conducting and capacitor 18 is charged to a voltage E1. When a positive potential is applied by way of resistor 15, transistor 14 conductors and capacitor 18 discharges in an exponential manner through resistor 17 and transistor 14.

FIG. 3 also includes an amplitude discriminator 11 comprising a pair of transistors 19 and 20 and a plurality of resistors 21 through 25. Prior to the application of a positive potential to the base of transistor 14, the voltage E1 across capacitor 18 causes transistor 19 to conduct. This produces a voltage drop across resistor 23 which, in combination with voltage V*y* on the base of transistor 20, back biases transistor 20. Transistor 20 is therefore cut off and its collector is at voltage E1.

When a positive voltage is applied to the base of transistor 14, capacitor 18 begins to discharge. The resulting decrease in voltage across capacitor 18 causes the voltage drop across resistor 23 to decrease. When the drop across resistor 23 and voltage V*y* no longer back bias transistor 20, transistor 20 conducts with a resulting drop in its collector potential.

Amplitude discriminator 12 in FIG. 3 comprises a pair of transistors 26 and 27 and a plurality of resistors 28 through 32. The operation of this discriminator is identical to that presented above with respect to discriminator 11. As voltage V*x* is less than voltage V*y*, transistor 27 begins conduction later than transistor 20.

Exponential generator 13 of FIG. 3 comprises a pair of transistors 33 and 34, a plurality of resistors 35 through 38 and a capacitor 39. When transistors 20 and 27 are both nonconducting, transistors 33 and 34 are conducting as a result of the positive potentials on the collectors of transistors 20 and 27, respectively. Voltage E1 and the voltage divider comprising resistors 35 and 37 are proportioned to place a charge on capacitor 39 so that the drop thereacross is one volt. When transistor 20 conducts, transistor 33 becomes reverse biased and cuts off. Capacitor 39 then begins discharging in an exponential manner through resistor 37 and transistor 34. When transistor 27 conducts, transistor 34 becomes reverse biased and cuts off. As capacitor 39 can neither charge nor discharge under these conditions, its voltage remains fixed. This is voltage V*o* shown in FIG. 2E between times *t*3 and *t*4.

When the positive potential applied to transistor 14 by way of resistor 15 is removed, capacitor 18 recharges, transistors 19 and 26 conduct, transistors 20 and 27 turn off, transistors 33 and 34 conduct and capacitor 39 recharges to a one volt level. The circuit is now ready to begin another cycle of operation.

From the above discussion, it is believed apparent that voltage V*o* is the ratio of voltage V*x* to V*y* during a sampling interval produced by the voltage applied by way of resistor 15. Furthermore, it is believed apparent that this output is a true ratio even though only a single sample is taken; in other words, it is not necessary to have the circuit operate in a regular cyclic manner in order to produce a useful output.

Figure 4:
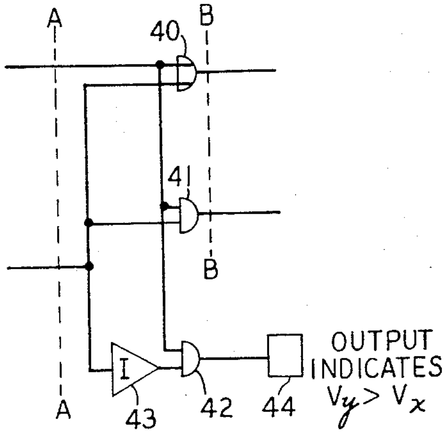
FIG. 4 is a block diagram of logic circuitry that may be used in the disclosed embodiment when the relative values of the two input voltages are unknown.

In the above discussion, voltage V*o* is always less than one volt, which implies that voltage V*x* must be less than voltage V*y*. There may be occasions, however, when voltage V*x* exceeds voltage V*y* and it is still desirable to produce a useful output. FIG. 4 discloses a logic circuit that may be used with the above discussed embodiment to accomplish this purpose. When used, this circuit is connected between discriminators 11 and 12 and exponential generator 13 so that an output from either discriminator will cause an OR gate 40 to apply an output to the start input of generator 13 and outputs from both discriminators are required for an AND gate 41 to apply an input to hold input of generator 13. By this arrangement, the larger of the two voltages V*x* and V*y* starts the exponential discharge of capacitor 39 while the smaller of the two voltages causes the cessation of the discharge. An indication of when the ratio is V*x* to V*y* is produced through the use of an AND gate 42, an inverter 43 and an indicator 44. The output of discriminator 11 and the inverted output of discriminator 12 are applied to AND gate 42 with the result that an output is applied to indicator 44 only when discriminator 11 produces an output before discriminator 12. Indicator 44 may be a lamp, tape printer or any other form of indicating arrangement.

In accordance with the invention, the ratio of voltage V*x* to voltage V*y* may be raised to the *k* power by making the time constants of the generators so that the time constant of generator 13 is *k* times that of generator 10.

Although only one embodiment of the invention has been disclosed and discussed in detail, various other embodiments may be devised by those skilled in the art without departing from the spirit and scope of the invention.

What is claimed is:

1. A combination comprising:

first and second exponential generators responsive to input voltages to produce output voltages that exponentially change in amplitude, means to apply an input voltage to said first genator, a first amplitude discriminator connected between said first and second generators to apply an input voltage to said second generator in response to the output voltage of said first generator passing through a first predetermined level, a second amplitude discriminator connected between said first and second generators to apply a voltage to said second generator to clamp said second generator output voltage in response to said first generator output voltage passing through a second predetermined level, and an output terminal connected to said second generator.

2. A combination to produce an output voltage proportional to the ratio of a first voltage to a second voltage, said combination comprising:

first and second generating means responsive to input voltages to produce output voltages that exponentially decay at substantially the same rates, said first generating means decaying toward zero from an initial level greater than the levels of each of said first and second voltages and said second generating means decaying toward zero from a substantially one volt level, means to apply an input voltage to said first generating means, first amplitude discriminating means to trigger said second generating means in response to the level of said first generating means output voltage substantially equaling said second voltage level, second amplitude discriminating means to clamp the output voltage of said second generating means in response to the level of said first generating means output voltage substantially equaling said first voltage level, and an output terminal connected to said second generating means.

3. A computing circuit comprising:

a first exponential generator having an input which when energized causes said first generator output voltage to decay at an exponential rate, a first amplitude discriminator connected to said first generator to produce an output in response to said first generator output voltage being less than a first predetermined level, a second amplitude discriminator connected to said first generator to produce an output in response to said first generator output voltage being less than a second predetermined level, a second exponential generator having a first input connected to said first discriminator and response to said first discriminator output to cause said second generator output voltage to decay at said exponential rate, said second generator having a second input connected to said second discriminator and responsive to said second discriminator output to cause said second generator output voltage to remain substantially constant in amplitude, means for energizing said first generator input, and an output terminal connected to said second generator output to make available said second generator output voltage as the output of said computing circuit.

4. A computing circuit comprising:

a first exponential generator having an input which when energized causes said first generator output voltage to decay at an exponential rate, a first amplitude discriminator connected to said first generator to produce an output in response to said first generator output voltage being less than a first predetermined level, a second amplitude discriminator connected to said first generator to produce an output in response to said first generator output voltage being less than a second predetermined level, a second exponential generator having a first input responsive to a first voltage to cause said second generator output voltage to decay at said exponential rate and a second input responsive to a second voltage to cause said second generator output voltage to remain substantially constant in amplitude, an OR gate having a pair of inputs connected to said discriminator, respectively, and an output connected to said second generator first input, an AND gate having a pair of inputs connected to said discriminators, respectively, and an output connected to said second generator second input, means connected to said discriminators to indicate when said first discriminator output occurs before said second discriminator output, means for energizing said first generator input, and means connected to said second generator output to make available said second generator output voltage as the output of said computing circuit.

References Cited

UNITED STATES PATENTS

| | | | |
|---|---|---|---|
| 3,043,516 | 7/1962 | Abbott et al. | 235—195 |
| 3,205,348 | 9/1965 | Kleinberg | 235—151.34 X |
| 3,309,510 | 3/1967 | Brown | 235—194 |

MALCOLM A. MORRISON, *Primary Examiner.*

JOSEPH F. RUGGIERO, *Assistant Examiner.*

U.S. Cl. X.R.

307—229